United States Patent [19]
Garner

[11] 3,873,656
[45] Mar. 25, 1975

[54] PRODUCTION OF LAMINAR ARTICLES

[75] Inventor: Paul Johnson Garner, Thorpe Bay, England

[73] Assignee: Imperial Chemical Industries Limited, London, England

[22] Filed: Dec. 4, 1972

[21] Appl. No.: 311,518

Related U.S. Application Data

[60] Continuation-in-part of Ser. No. 132,971, April 12, 1971, Pat. No. 3,733,156, which is a continuation-in-part of Ser. Nos. 202,457, and 202,458, Nov. 26, 1971, abandoned, which is a division of Ser. No. 781,763, Dec. 6, 1968, Pat. No. 3,599,290.

[52] U.S. Cl. ............... 264/55, 161/190, 264/45, 264/328
[51] Int. Cl. ............................................. B29d 27/00
[58] Field of Search ........ 264/45, 328, DIG. 83, 51, 264/53, 54, 55

[56] References Cited
UNITED STATES PATENTS

| | | | |
|---|---|---|---|
| 2,768,407 | 10/1956 | Lindemann | 264/45 X |
| 3,319,301 | 5/1967 | Ludwig | 264/45 X |
| 3,378,612 | 4/1968 | Dietz | 264/45 |
| 3,389,198 | 6/1968 | Taber | 264/54 X |
| 3,468,990 | 9/1969 | Odell | 264/45 |
| 3,599,290 | 8/1971 | Garner | 264/45 X |
| 3,652,757 | 3/1972 | Wessel et al. | 264/244 |
| 3,751,534 | 8/1973 | Oxley | 264/45 |
| 3,793,415 | 2/1974 | Smith | 264/45 |

FOREIGN PATENTS OR APPLICATIONS

| | | | |
|---|---|---|---|
| 1,219,097 | 1/1971 | United Kingdom | 264/45 X |

OTHER PUBLICATIONS

Def. Pub. T–883,004, Sandiford et al., 2-2-1971, filed 10-27-1969.
Def. Pub. T–893,010, Oxley, 12-14-1971, filed 2-4-1971.

*Primary Examiner*—H. S. Cockeram
*Attorney, Agent, or Firm*—Cushman, Darby & Cushman

[57] ABSTRACT

A process in which a skin material is injected through a sprue channel into a mould cavity followed by a core material, wherein a further quantity of skin and/or core material is injected into the mould cavity through a second sprue channel displaced from the first.

10 Claims, 18 Drawing Figures

PRODUCTION OF LAMINAR ARTICLES

This application is a continuation-in-part of my copending application Ser. No. 132,971 filed Apr. 12, 1971 (now issued as U.S. Pat. No. 3,733,156) which in turn is a divisional of my application 781,763 filed Dec. 6, 1968 (now issued as U.S. Pat. No. 3,599,290).

The present application is also a continuation-in-part of my copending application Ser. No. 202,457 (now abandoned) and of my copending application Ser. No. 202,458 both filed Nov. 26, 1971.

The present invention relates to improvements in or relating to the production of laminar articles by which we mean articles having a sandwich construction of a skin of one plastics material surrounding a core of a dissimilar plastics material except at the sprue area of the moulding as discussed hereinafter.

In my parent application Ser. No. 781,763 (now U.S. Pat. No. 3,599,290) I described the production of such articles from plastics materials by an injection moulding process wherein the plastics materials are sequentially injected into a mould cavity so that the second, and any subsequently injected material, penetrates to within the first material and causes the enveloping first material to expand.

A sequential injection process for the production of such articles wherein the core material is foamable is described in British Pat. Specification No. 1,156,217.

When plastics materials are injected in a fluid condition, i.e., as a melt, through a sprue channel into a mould cavity of constant cross-section, they flow outwards from the sprue channel until the melt front is locally halted by encounter with the walls of the mould cavity. Normally the melt front contacts the walls of the mould cavity in some places before others, i.e., the lengths of the flow paths from the sprue channel to the mould cavity extremities differ from one part of the mould to another. This is also true when, as is more common, the cavity is not of constant cross-section.

When a second material is injected to within the first material after a predetermined amount of the latter has been injected, the second material extends the enveloping skin of the first material until the mould cavity is filled. Because of the different flow paths, the enveloping skin has to be extended more in some directions than in others and so there will remain more skin at some points on the periphery of the moulding than at others.

In other cases it may be desired to obtain a more uneven distribution of skin thickness in the moulded article than would otherwise be obtained. For example it may be desired to form a shoe sole having a thin sole portion having a thick skin and a thicker heel portion having a thin skin. While it is often possible to modify the distribution of the skin material relative to the core material by altering the sprue position and/or thickness of the desired article, it is desirable to provide an alternative method, which could be used in addition to modification of the sprue position and/or article thickness, in order to provide the moulder with a further degree of freedom.

The present invention is based on the principle of injecting the materials through more than one sprue channel.

In the aforesaid British Pat. No. 1,156,217, while it was preferred that the skin and core materials were injected through the same sprue channel, it was also envisaged that separated sprue channels could be used provided that the two channels were sufficiently close that the core material was injected to penetrate to within the interior of the skin material. This meant that the two sprue channels had to be sufficiently close that, after injection of the skin material, the skin material had filled the mould cavity to such an extent that the sprue channel for the core material was covered by the skin material.

While this technique does provide the moulder with some latitude in modifying the distribution of the skin and core materials in the mould cavity, it is desirable to provide a further degree of latitude.

In the present invention this is achieved by injecting both skin and core materials through one sprue channel and a further quantity of skin and/or core material through another sprue channel.

Accordingly the present invention provides a process for the production of articles having a skin of plastics material enclosing a core of dissimilar plastics material wherein the skin and core materials are sequentially injected in a fluid state into a mould cavity through a first sprue channel, the core material being injected to within the skin material while the skin material is fluid so as to extend the enveloping skin material characterized in that, in order to obtain a desired distribution of skin and core material in the moulding, a further quantity of skin and/or core material is injected in a fluid state into the mould cavity through a second sprue channel, displaced from the first sprue channel, where the further quantity of material is skin material, or skin material followed by core material, it being injected at such a time that it contacts the skin material injected through the first sprue channel while the latter is fluid so that the skin material injected through the second sprue channel merges with, or penetrates to within, the skin material injected through the first sprue channel, and where the further quantity of material is core material, it being injected after skin material injected through said first, or another sprue channel has extended to beneath the second sprue channel and while said skin material is fluid so that the further quantity of core material is injected to within the skin material.

It will be appreciated that there are three possible alternatives. Firstly the material injected through the second sprue channel is only skin material. In the second case it is core material, while in the third case it is skin material followed by core material. In order to ensure that the core material is enclosed by the skin, sufficient skin material has to be injected to ensure that, as the enveloping skin is extended by the core material to fill the mould cavity, the enveloping skin is not ruptured. This amount can readily be established by a few simple trial mouldings using different amounts of skin material.

In the first case, where the material injected through the second sprue channel is skin material, it may be injected before, during, or after injection of the skin material through the first sprue channel so that, together with the skin material injected through the first sprue channel, it forms the skin material which is expanded by the injection of the core material. Preferably the skin material is injected through the second sprue channel after the skin material injected through the first sprue channel has extended to beneath the second sprue channel. Furthermore it is possible to inject the skin material into the mould cavity through the second sprue channel after injection of the core material through the first sprue channel has commenced. In this embodiment it is preferred that the skin material is injected through the second sprue channel before the core material injected through the first sprue channel has extended to beneath the second sprue channel, so that the skin material injected through the second sprue channel is not injected to within the core material. However in some cases it might be desired, in order to cause the core material to penetrate the skin material further in one direction than in another, to inject the skin material through the second sprue channel during or after injection of the core material through the first sprue channel and after the core material injected through the first sprue channel has extended to beneath the second sprue channel, so that the skin material injected through the second sprue channel penetrates to within the core, hence displacing the core.

In the second case, where the material first injected through the second sprue channel is core material, it is necessary, in order that the core shall be encapsulated by the skin (except at the sprue area of the moulding as discussed hereinafter), that the core material injected through the second sprue channel is injected after the skin material injected through the first sprue channel or through another sprue channel has extended to beneath the second sprue channel so that the core material injected through the second sprue channel is injected to within the skin material. While the core material injected through the second sprue channel is preferably injected after the core material injected through the first sprue channel has extended to beneath the second sprue channel so that the core material injected through the second sprue channel penetrates to and becomes integral with the core material injected through the first sprue channel, in some cases, where it is desired to have regions of the article having areas of skin material enclosing a core separated by regions consisting only of skin material, the core material can be injected through the second sprue channel before the core material injected through the first sprue channel has extended to beneath the second sprue channel. Indeed, in this case, the core material may be injected through the second sprue channel before the core material is injected through the first sprue channel.

It will be appreciated that the core material injected through the second sprue channel can be different, if desired, to that injected through the first sprue channel so that mouldings with different physical characteristics in different areas can be produced. For example this technique may be used in the production of shoe soles where a flexible core material may be used in the sole portion and a rigid core material in the heel.

In the third alternative, where skin material followed by core material is injected through the second sprue channel, the skin material can be injected before, during or after the skin material is injected through the first sprue channel or during or after injection of the core material through the first sprue channel, but preferably before the core material injected through the first sprue channel has extended to beneath the second sprue channel. Likewise the core material may be injected through the second sprue channel before, during, or after injection of the skin or core materials through the first sprue channel. However the core material is preferably injected through the second sprue channel after the core material injected through the first sprue channel has extended to beneath the second sprue channel so that the core material injected through the second sprue channel penetrates and becomes integral with the core material injected through the first sprue channel, although, as discussed above, in relation to the embodiment where only core material is injected through the second sprue channel, there may be cases where it is desired to inject the core material through the second sprue channel before the core material injected through the first sprue channel has extended to beneath the second sprue channel.

It will be appreciated that, in this embodiment where both skin and core materials are injected through the second sprue channel, it is immaterial which sprue channel is considered to be the first sprue channel and which is considered to be the second sprue channel.

While the invention has been described above in relation to two sprue channels, there may, if desired, be more than two channels. All that is essential for the purposes of the present invention is that skin and core materials are sequentially injected through one of the sprue channels and skin and/or core materials through the other sprue channels. Thus, for example, skin and core materials may be sequentially injected through one sprue channel, skin material through a second sprue channel, and core material through a third sprue channel. In such a case it is not necessary that the second sprue channel is covered by skin material injected through the first sprue channel before injection of the core material through the second sprue channel, as the second sprue channel may be covered by skin material injected through the third sprue channel. The use of more than two sprue channels is further described in German application No. 21.59383.9.

In order to further modify the distribution of skin and core materials within the mould, more skin material than is desired may be injected into the mould cavity and the excess of skin material is forced back through the sprue channel through which it was injected by injection of core material. This technique is further described in my copending U.S. Application No. 202,459 (now Defensive Publication T 904,007007) filed Nov. 26, 1971.

It will be appreciated that the material injected through the second sprue channel must be injected at such a time that it contacts the skin material injected through the first sprue channel while the latter is in a fluid condition so that the material injected through the second sprue channel merges with, or penetrates to within, the skin material injected through the first sprue channel.

It will be appreciated that the sizes of the different sprue channels may differ and the amount of material injected through the different sprue channels may also differ. Where the plastics materials are thermoplastic they have to be cooled to cause them to be solidified from the fluid state in which they were injected into the mould cavity. Preferably, to enhance such setting, the mould is cooled but the choice of mould temperature depends on the materials being processed. Generally mould temperatures in the range of 0° to 100°C are suitable. However, if the sprue channels are some distance apart it may be necessary to heat the mould or that part of the mould around the sprue channels to ensure that the skin material injected through one sprue channel is in a fluid condition when the material injected through another sprue channel makes contact therewith so that it merges with or penetrates to within the skin material injected through said one sprue channel. The area of the mould surrounding the sprue channels may be heated during the moulding cycle and then cooled to allow the plastics materials to solidify (if they are thermoplastics). Alternatively, where the material injected throughh one sprue channel is to penetrate to within the skin material injected through another sprue channel, the sprue channels may be heated by a movable probe which may be moved to pierce the skin material injected through said other sprue channel after it has covered said one sprue channel to permit injection of the material injected through said one sprue channel.

Plastics materials that may be used in the present invention are those which can be injected into a mould cavity while in the state of a viscous liquid and which can thereafter be cause to solidify in the mould cavity. Thus thermoplastic resinous materials may be used which can be injected in the form of viscous melts and allowed to solidify in the mould cavity by cooling. Alternatively thermosetting resinous materials may be used which can be injected into the mould cavity in the state of a viscous liquid and then caused to solidify by effecting cross-linking while in the cavity. Generally the thermosetting resinous materials are cross-linked by heating.

Examples of suitable injection mouldable thermoplastic resins which may be used include polymers and copolymers of α-olefins, such as high and low density polyethylene, polypropylene, polybutene, poly-4-methyl pentene-1, propylene/ethylene copolymers, copolymers of 4-methyl pentene-1 with linear α-olefines containing 4 to 18 carbon atoms, and ethylene/vinyl acetate copolymers; polymers and copolymers of vinyl chloride, vinyl acetate, vinyl butyral, styrene, substituted styrenes such as α-methyl styrene, acrylonitrile, butadiene, methyl methacrylate, vinylidene chloride. Specific examples of such polymers include vinyl chloride homopolymers and copolymers of vinyl chloride with vinyl acetate, propylene, ethylene, vinylidene chloride, alkyl acrylates such as 2-ethyl hexyl acrylate, alkyl fumarates, alkyl vinyl ethers, such as cetyl vinyl ether, and N-aryl maleimides such as N-o-chlorophenyl maleimide; polyvinyl acetate, polyvinyl butyral; polystyrene, styrene/acrylonitrile copolymers; copolymers of butadiene with methyl methacrylate and/or styrene and optionally acrylonitrile; polymethyl methacrylate; copolymers of methyl methacrylate with minor amounts of alkyl acrylate such as methyl acrylate, ethyl acrylate and butyl acrylate; copolymers of methyl methacrylate, N-aryl maleimides and optionally styrene; and vinylidene chloride/acrylonitrile copolymers, melt processable copolymers of tetrafluoroethylene and hexafluoropropylene.

Halogenated polymers or copolymers may be used; for example halogenated α-olefin polymers, such as chlorinated polyethylene, or halogenated vinyl chloride polymers, such as chlorinated polyvinyl chloride.

Other injection mouldable thermoplastic polymers that may be used include condensation polymers such as the injection moulding grades of linear polyesters such as polyethylene terephthalate; polyamides such as polycaprolactam, polyhexamethylene adipamides and copolyamides such as copolymers of hexamethylene diamine adipate and hexamethylene diamine isophthalate, particularly those containing from 5 to 15 percent by weight of hexamethylene diamine isophthalate; polysulphones and copolysulphones; polyphenylene oxides; polycarbonates, thermoplastic polymers and copolymers of formaldehyde; thermoplastic linear polyurethanes; and the thermoplastic derivatives of cellulose such as cellulose acetate, cellulose nitrate and cellulose butyrate and mixed cellulosic esters, for example cellulose acetate butyrate.

Where a copolymer is used, the amounts of the co-monomers that are used in the copolymer will depend, inter alia, on the properties required of the moulding.

Thermosetting resins include plastics materials that either undergo cross-linking of their own accord or in the presence of a hardener or catalyst when heated to a sufficiently high temperature. Thus the term includes a material falling within the commonly understood ambit of the term "thermosetting," and also a plastics material which is normally thermoplastic but contains a cross-linking agent such as a peroxide which causes cross-linking when the plastic is heated to a sufficiently high temperature.

Examples of suitable thermosetting resins that may be used include phenol-aldehyde resins, amineformaldehyde resins, epoxy resins, polyester resins, thermosetting polyurethanes, and vulcanisable rubbers.

The resins may contain a hardening agent or catalyst where this is necessary to enable the resin to set.

Injection mouldable cross-linkable thermoplastics include copolymers of methyl methacrylate and glycol dimethacrylate and ethylene/vinyl acetate copolymers containing a cross-linking agent.

Blends of plastics materials may be used.

The choice of materials from which the article is to be made will depend upon the use to which the article is to be put. The process of the present invention does, however, provide a particularly useful way of producing articles having a core of relatively cheap material provided with a good facing. For example, the core may be of a thermoplastic material containing a filler whereas the outer skin of a material may provide any desired surface finish. If the process is used to produce parts of the bodies of motor vehicles then a stiff outer skin will be required and filled polypropylene is a particularly good resin from which to form the outer skin. However, if a flexible moulding is required, for example, for the interior trim of a motor car then plasticised vinyl chloride polymer will be eminently suitable as the outer layer of the moulding.

Where skin material is injected through more than one sprue channel, it will be appreciated that the skin materials may be different provided that they are compatible so that they can merge together to form a strong bond with each other. Generally such different skin materials will only differ in additives they contain, e.g., pigments so that two- or multi-coloured articles can be produced, or additives that modify the properties of the skin material. Thus, for example, different skin materials may be plasticised polyvinyl chloride on the one hand and plasticised polyvinyl chloride containing a nitrile rubber on the other hand; the nitrile confers additional wear resistance to the composition.

The core material may be the same as the skin material with the exception of additives which are included in one or in the other of the materials or in both but in different proportions. Alternatively the plastics may be quite different and also may contain different additives.

In a preferred embodiment, the core material is foamable. Preferably it comprises a polymeric material and a blowing agent that evolves a gas on heating above a certain temperature, herein termed the activation temperature, e.g., by volatilisation (when the pressure on the composition is reduced) or by decomposition, and is injected at a temperature above the activation temperature of the blowing agent. It is preferred that the plastics material is heated to the foaming temperature, i.e., to above the activation temperature, as it is injected into the sprue channel, by relying on the dynamic heating occurring as the material passes through the injection nozzle of the injection moulding machine.

If the core material is injected at the customary injection rates and pressures used in injection moulding, substantially no foaming will occur until the desired amount of core material has been injected. When using a foamable core material, two alternative modes of operation may be utilised. In the first, the amount of skin material and foamable, but as yet unfoamed, core material injected is insufficient to fill the mould cavity and the core material is allowed to foam, at the same time extending the enveloping skin material to the extremities of the mould cavity. In the second mode of operation, the amount of skin material and foamable, but as yet unfoamed, core material injected is such that the cavity is filled before substantial foaming takes place, and the mould cavity is then enlarged to permit foaming to occur.

It is preferred to use the second of these alternatives as this provides a more regular cell structure in the core of the moulded article and also produces an article with superior surface finish.

In this preferred embodiment for the production of foamed mouldings as set out above, the enlargement of the mould cavity may be effected in one of two ways. One or more of the mould members defining the mould cavity may be retracted by some external force which may instantaneously enlarge the cavity to the desired extent or may gradually enlarge the cavity. Alternatively, when using a vertical flash mould, the clamping pressure holding the mould halves together may be reduced so that the pressure of the gases generated by the decomposition or volatilisation of the blowing agent will enlarge the mould cavity; here again the locking pressure may be reduced gradually allowing a gradual expansion of the mould cavity or reduced instantaneously allowing a sudden expansion.

The design of the mould should be such that there is minimum loss of material from the mould during the moulding cycle especially when the materials are under high pressure. Moulds of the type generally known as vertical flash moulds are particularly suitable particularly when it is desired to enlarge the mould cavity. Where there is a possibility of air being trapped between advancing fronts of skin material in the mould cavity, vents may be provided in the mould to allow the trapped air to be expelled.

The size and shape of the mould cavity depends on the article being produced but moulds of maximum cavity thickness less than 25 mm preferably between 2 mm and 10 mm thick, are particularly useful.

The process of the present invention is conveniently carried out using a machine containing an injection moulding barrel corresponding to each sprue channel, the operation of which are synchronised to achieve the required moulding cycle. I prefer that taps are provided to control the flow of material from the injection barrels into the mould cavity, particularly for the flow of the material through the first sprue channel so that the material injected through the first sprue channel can be stopped from flowing back into the injection barrel due to the injection of the material through the second sprue channel unless this is specifically desired. Examples of tap designs are described in my U.S. Pat. Nos. 3,599,290 and 3,690,797. If the process of the invention is used to produce foamed core mouldings and the mould cavity is to be enlarged to allow the charge of foamable material to foam, this enlargement of the mould must be also included in the programming of the machine.

As mentioned hereinbefore the process of the present invention produces articles having a skin of a plastics material surrounding and contacting a core of dissimilar plastics material except, possibly, at the sprue areas of the article.

Generally injection moulded articles are removed from the mould cavity with the material solidified in the sprue channels attached thereto. These sprues are generally not part of the desired article and so are removed from the moulding after the latter is taken from the moulding cavity. The area of the article from which the sprue was detached is termed the sprue area.

When the core material is injected into the mould cavity through a sprue channel to penetrate to within the interior of the skin material a small amount of core material will occur at the surface of the sprue area of the article if the sprue is detached therefrom.

The amount of the core material exposed to the sprue area can be reduced by injecting a further, small, quantity of skin material through the same sprue channel through which the core material was injected, after injection of the core material, so that, when the sprue is removed from the moulding, only a narrow annulus of core material is left exposed. This narrow annulus results from core material not swept out of the sprue channel by the injection of this small further charge of skin material as it adheres to the walls of the sprue channel. However by using high injection rates and heated sprue channels so that very little core material is left as an adhering layer on the sprue channel walls, the narrow annulus of core material exposed at the sprue area of the article can be made so narrow that it is virtually indistinguishable.

Therefore I prefer to inject a further quantity of skin material through the first sprue channel and/or through the second sprue channel if core material has been injected therethrough, after injection of the core material.

The process of the present invention may be used to produce a wide variety of articles. As stated above, the process is particularly useful in the production of mouldings consisting of one thin portion and a thick portion such as shoe soles. Articles with a rigid or with a flexible skin may be prepared by our process. Examples of articles with a rigid skin included articles of furniture and panels which may be building panels or panels to form the bodies of motor vehicles and trains. In addition to shoe soles, examples of articles with a flexible skin which may be prepared include parts of the interior trim of motor cars, railway carriages, caravans, aeroplanes and a wide variety of other applications. In one embodiment of the invention at least part of one or more walls of the mould cavity may be provided, prior to the injection of the materials into the mould cavity, with a removable lining of a material that retains its shape at the temperatures at which the plastics materials are injected into the mould cavity. The plastics materials will then adhere to the lining when they are injected into the mould cavity and the sandwich structure article with the lining firmly bonded thereto can be removed from the mould cavity after solidification of the plastics materials. Thus this technique may be used to provide a rigid backing to, for example, a cellular article having an unfoamed skin. This is particularly useful in the production of flexible mouldings for the interior trim of motor vehicles, where it is desirable to have a resilient trim with a pleasing surface which can be rigidly mounted in the motor vehicle. In this case one of the walls of the mould may be lined to provide the backing to mount the trim whereas the other is not lined thus providing the pleasing surface. Examples of suitable lining materials include wooden sheets such as plywood and hardboard, metal sheets or sheets of thermoplastic materials which retain their shape, i.e., are form stable, at the moulding temperature. Alternatively, the lining could, if desired be of a flexible material such as the upper materials of a shoe or boot on to which the sole is moulded by the process of the present invention.

The invention is further illustrated by reference to the accompanying drawings wherein.

In the drawings, for simplicity, each sprue channel is shown provided with a simple multiway tap having a single bore. However preferably each tap has a separate bore for each material to be fed through the sprue channel. Such taps are described in my U.S. Pat. No. 3,599,290. Where in the drawings, the tap is shown closed, the bore is shown filled with the material injected through that tap prior to closing it. Also, for simplicity, the cavity is shown to be of constant cross-section and of the same shape in each filling sequence. It will be appreciated that, in practice, certain sequences are more useful in cavities of non-uniform, or irregular, cross-section.

Figure 1:
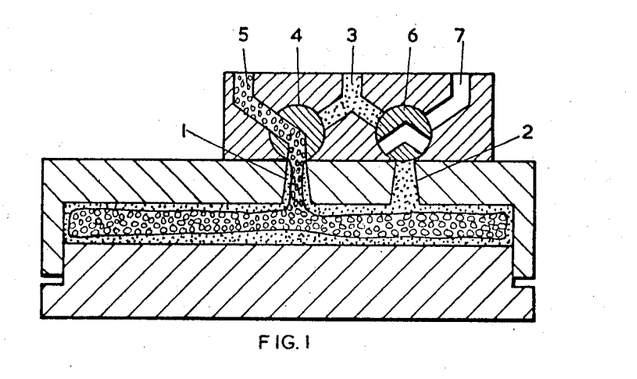
FIGS. 1 to 16 are cross-sections of a mould cavity provided with two sprue channels showing different mould cavity filling sequences.

In FIG. 1 is shown a prior art process wherein only one of the sprue channels 1, 2 is used. Here skin material is injected, via a feed channel 3, into the mould cavity through a tap 4, adjacent sprue channel 1. When a predetermined amount of skin material has been injected, tap 4 is switched to permit injection of the core material from feed channel 5. The core material extends the enveloping skin material to the extremities of the mould cavity to give the situation shown in FIG. 1. In the process of extending the skin material to the extremities of the cavity, the skin is thinned and this gives rise to portions of the moulding at points remote from the sprue channel 1 having thinner skins than those nearer to sprue channel 1; i.e., the moulding has an uneven skin thickness.

Figure 2:
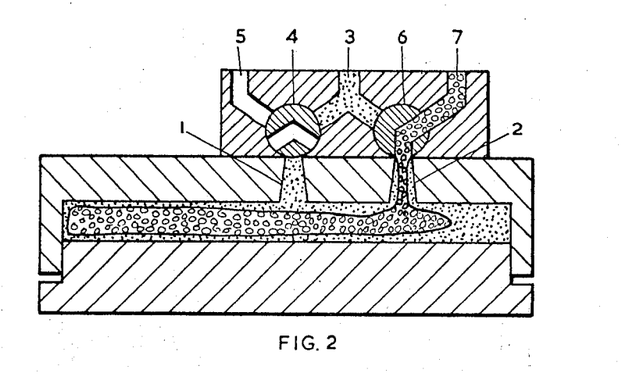

In the prior art embodiment shown in FIG. 2, sprue channel 1 and tap 4 are not used, the skin and core materials being fed into the cavity nearer to one end thereof through sprue channel 2 via tap 6 and feed channels 3 (for the skin material) and 7 (for the core material). While such a technique can be used to provide a marked variation in skin thickness in the moulding, it lacks versatility.

Figure 3:
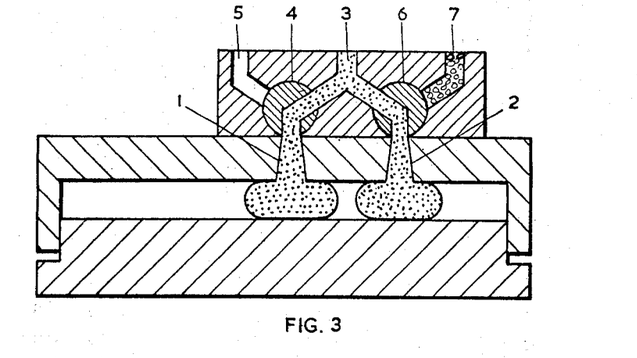

In FIGS. 3 to 6 is shown a sequence of filling the mould cavity according to the present invention. Here both sprue channels and both taps are used. Firstly, as shown in FIG. 3, skin material is injected through both sprue channels from feed channel 3.

Figure 4:
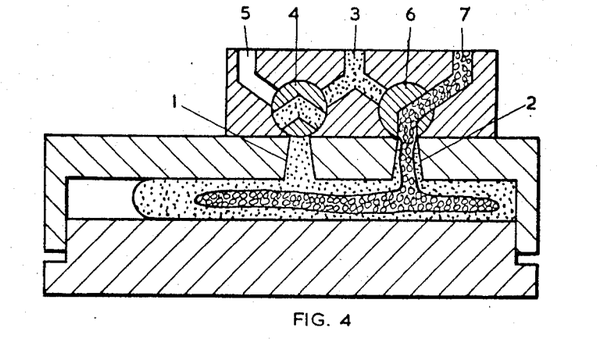
Figure 5:
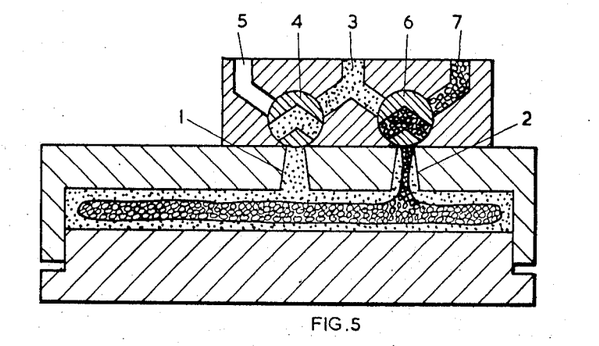
Figure 6:
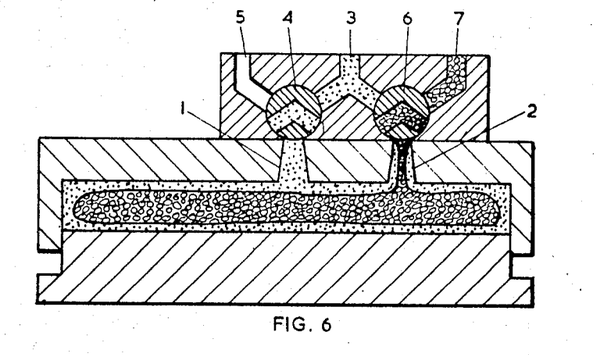

It will be appreciated that the injection through both channels need not be simultaneous. Tap 4 is then switched to a "shut off" position while tap 6 is switched to communicate with core material feed channel 7. Core material is then injected, as shown in FIG. 4, through the sprue channel 2 and extends the enveloping skin material so that the latter merges with the skin material injected through sprue channel 1 and forces the skin material to the extremities of the mould cavity. Tap 6 is then switched to a "shut-off" position as shown in FIG. 5. If the core material is foamable, it can be caused to foam by allowing the mould cavity to enlarge as shown in FIG. 6. It is seen that because of the injection of skin material through sprue channel 1 a larger quantity of skin material was provided in the region where the skin has to be stretched furthest and so the resultant moulding has a more uniform skin thickness.

Figure 7:
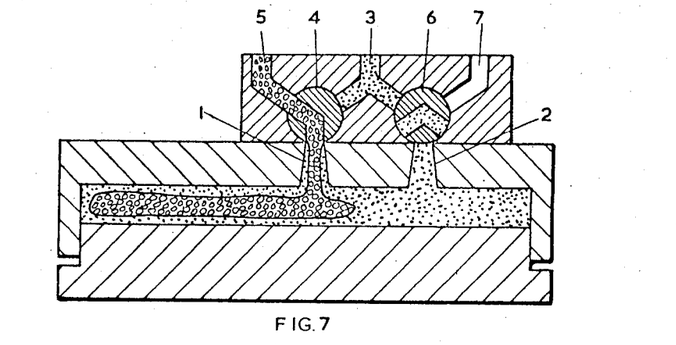

In FIG. 7 there is shown a modification of the process designed to give a moulding having a non uniform distribution of skin material relative to the core material. Here skin material is injected, as in FIG. 3, through both sprue channels 1 and 2 from feed channel 3. The core material is then injected through sprue channel 1 from feed channel 5. In this way the moulded article has a substantial portion formed only from skin material and a laminar structure with the skin material enclosing the core over the remainder of the article.

Figure 8:
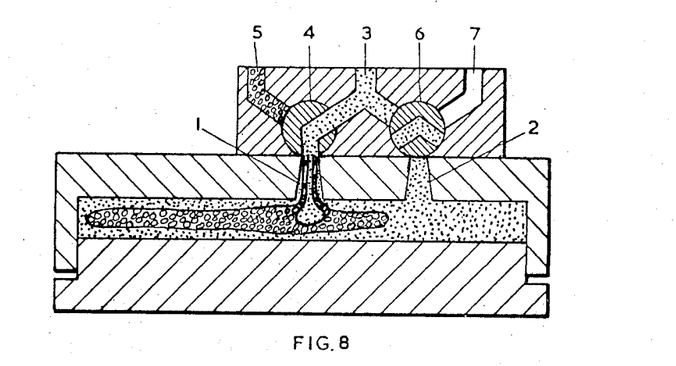

In FIG. 8 there is shown a preferred variation of the system shown in FIG. 7. After injection of the core material through sprue channel 1, tap 4 is switched to inject a further small amount of skin material through sprue channel 1 so that, on removal of the sprues formed in sprue channels 1 and 2 from the moulding, an article is produced wherein the surface exposed by the removal of the sprue formed in sprue channel 1 only shows a narrow annulus of core material instead of the solid area of core material exposed when the sprue formed in sprue channel 1 is removed from the moulding made by the system shown in FIG. 7.

Figure 9:
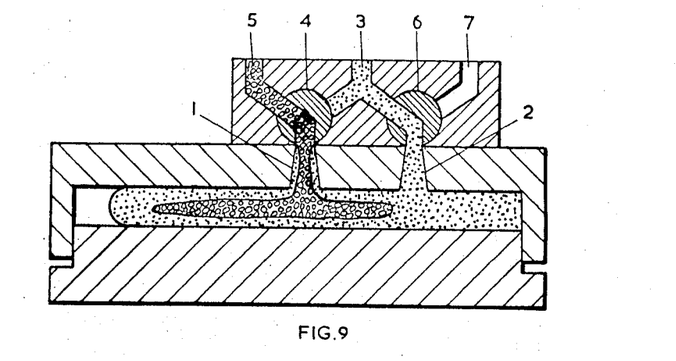

In FIG. 9 there is shown another variation on the system shown in FIG. 7 wherein, after injection of the skin material feed channel 2, tap 6 is not switched to the "shut-off" position but remains in communication with feed channel 3 and sprue channel 2. On injection of the core material from feed channel 5 through sprue channel 1, some of the skin material is forced back through sprue channel 2 into feed channel 3.

Figure 10:
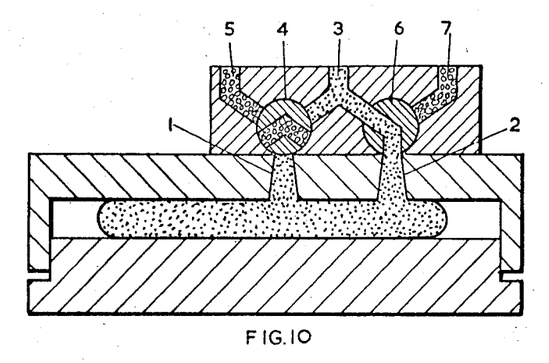
Figure 11:
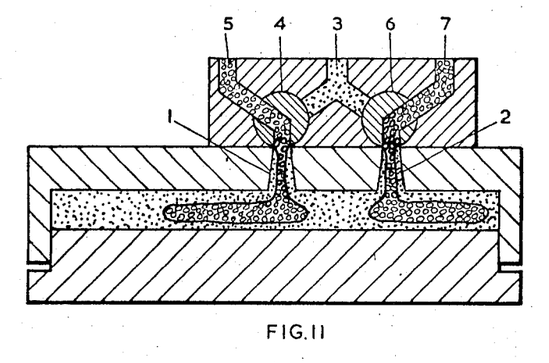

In FIGS. 10 and 11 another sequence is shown wherein skin material is first injected through sprue channel 2 at least until it has filled the sprue channel 1 (as shown in FIG. 10) and then core material from feed channels 5 and 7 is injected through both sprue channels 1 and 2 respectively, (as shown in FIG. 11) so that there is produced an article having regions of laminar structure of the skin material enclosing the core separated by a region composed only of skin material.

Figure 12:
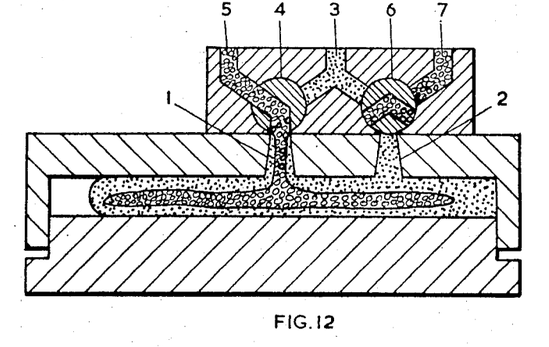
Figure 13:
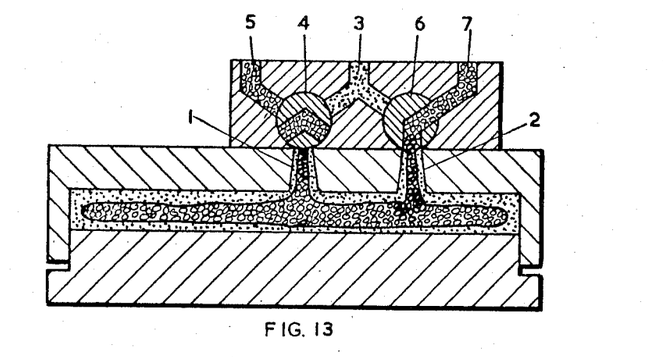

In FIGS. 12 and 13 another sequence, a variation on that of FIGS. 10 and 11 is shown. Here skin material is injected through sprue channel 1 from the feed channel 3 and then tap 4 is switched to inject core material from channel 5 through sprue channel 1. After the core material has extended to beneath sprue channel 2, tap 6 is switched from its "shut-off" position to inject core material from feed channel 7 through sprue channel 2 and tap 4 can be switched to the shut off position (see FIG. 13).

Figure 14:
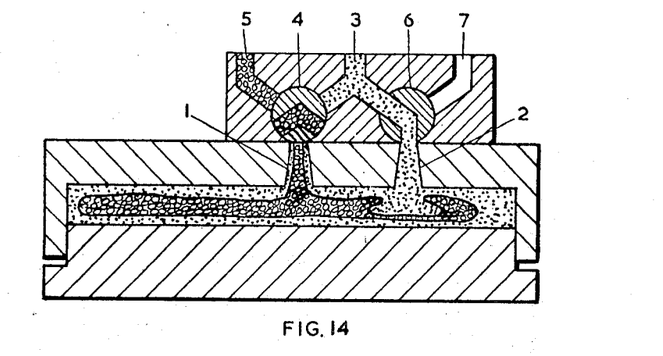

In the system shown in FIG. 14, which is a variation of that of FIGS. 12 and 13, skin material instead of core material is injected through sprue channel 2 after the core material injected through sprue channel 1 has extended to beneath sprue channel 2.

Figure 15:
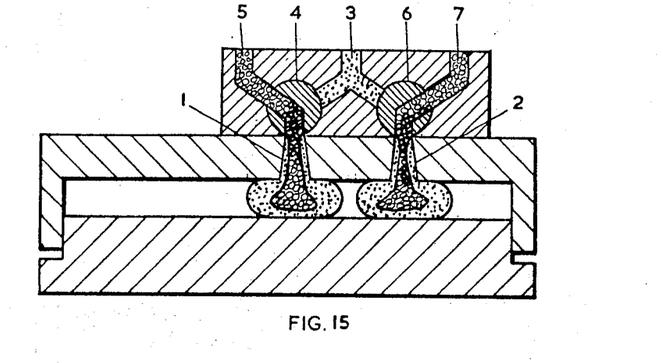
Figure 16:
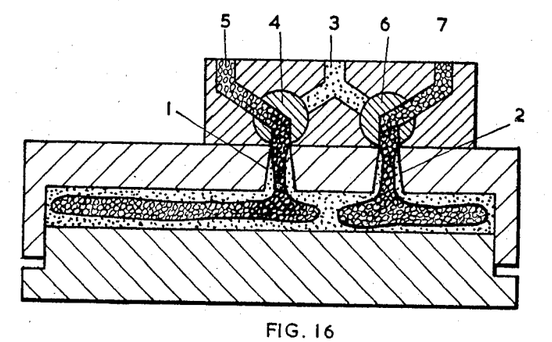

In the sequence shown in FIGS. 15 and 16, skin material is injected through both sprue channels 1 and 2 and then core material is injected through both sprue channels (see FIG. 15). The injection of the core material extends the enveloping skin material so that the two portions of skin material merge together to give an article having two portions of a laminar structure separated by a portion composed only of skin material.

Figure 17:
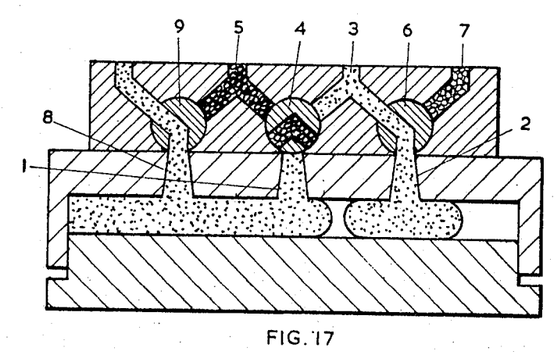
FIGS. 17 and 18 are views similar to those of FIGS. 1 to 16 but showing a mould cavity provided with three sprue channels.
Figure 18:
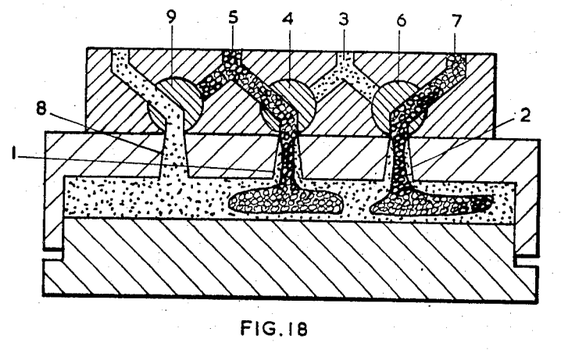

In FIGS. 17 and 18 a system using three sprue channels 1, 2, 8, the additional sprue channel 8 being provided with a tap 9. Skin material is injected through sprue channels 2 and 8 (see FIG. 17) and, after the skin material injected through sprue channel 8 has filled sprue channel 1, taps 4 and 6 are switched to inject core material through sprue channels 1 and 2. The injection of the core material extends the enveloping skin material so that the two portions of skin material are caused to merge together and the excess of skin material is forced back through sprue channel 8.

An example of how the process may be performed is as follows:

A mould cavity in the shape of a disc 20 cm diameter and 4 mm thick having an extension 10 cm long and 3 cm wide protruding from the circumference of the disc is defined by the mould members of a vertical flash mould.

A first sprue channel is provided at the centre of the disc and a second sprue channel is provided at the junction of the disc and the extension thereto. The total volume of the mould cavity, including sprue channels, is about 150 cm$^3$. About 40 cm$^3$ of polypropylene as skin material is injected through the first sprue channel and a further 15 cm$^3$ of polypropylene as skin material is injected through the second sprue channel simultaneously with that injected through the first sprue channel. The skin materials are injected at a temperature of 240°C and a pressure of about 135 MNm$^{-2}$. As soon as injection of the skin material is completed, polypropylene containing 0.4 percent by weight of azodicarbonamide as blowing agent is injected at 210°C and at a pressure of about 135 MNm$^{-2}$, as core material, through the first sprue channel. The amount of unfoamed core material injected is about 95 cm$^3$ so that the mould cavity is filled, by extension of the enveloping skin material, which merges with that injected through the second sprue channel when it makes contact therewith, before substantial foaming of the core material takes place. The mould members of the vertical flash mould are then allowed to move apart, by relaxing the clamping pressure holding them together, until the cavity has a thickness of 10 mm thereby allowing the core material to foam. The moulding is then cooled and removed from the mould cavity.

Another example of how the process may be performed is as follows:

A mould cavity in the shape of a square panel of size 50 cm is defined by the mould members of a vertical flash mould. The cavity thickness is 0.4 cm.

A main sprue channel is positioned to communicate with the centre of the cavity and an additional sprue channel is positioned to communicate with the mould cavity at a point on each diagonal of the square 22 cm from the centre of the square. The total volume of the mould cavity was about 1,008 cm$^3$, each of the additional sprue channels having a volume of about 1.5 cm$^3$.

About 400 cm$^3$ of a lightly plasticised vinyl chloride polymer composition, as skin material, is injected through the central main sprue channel at a temperature of 185°C, and, at the same time, about 29 cm$^3$ of the same composition is injected through each of the four additional sprue channels.

As the injection of the skin material through the five sprue channels nears completion the advancing front of skin material injected through the main sprue channel contacts, and merges with, the skin material injected through the additional sprue channels. The skin materials are injected at a pressure of about 135 MNm$^{-2}$.

On completion of the injection of the skin material, a foamable core material, a plasticised vinyl chloride polymer composition containing 0.7 percent by weight of azodicarbonamide as blowing agent is injected at a temperature of 180°C and a pressure of about 135 MNm$^{-2}$ through the main sprue channel. The injection of the core material extends the enveloping skin material to fill the mould cavity. Sufficient (about 492 cm$^3$) of the unfoamed, but foamable, core material is injected so that the mould cavity is filled without foaming taking place. The mould cavity is then enlarged, by relaxing the clamping pressure holding the mould members together, so that the thickness of the mould cavity is increased to 0.7 cm, thereby permitting the foamable core to foam. The moulding is then cooled and removed from the mould cavity. The moulding has a more uniform skin thickness, especially in the region of the corners of the square, than is obtained when injecting both materials only through a central sprue channel.

I claim:

1. A process for the production of articles having a skin of plastics material enclosing a core of dissimilar plastics material comprising:
   i. injecting the skin material in a fluid state into a mold cavity through a first sprue channel; subsequently,
   ii. injecting the core material in a fluid state to within the skin material through said first sprue channel, while the skin material is fluid whereby the core material extends the enveloping skin material; and
   iii. injecting a further quantity of plastics material in a fluid state into the mold cavity, through a second sprue channel displaced from the first sprue channel.

2. A process as claimed in claim 1 comprising injecting, after injection of the further quantity of plastics material through the second sprue channel, an additional quantity of a plastics material, that is dissimilar to said further quantity of plastics material, in a fluid state through the second sprue channel to within the said further quantity of plastics material while said further quantity of plastics material is fluid whereby said additional quantity of plastics material extends the enveloping skin of said further quantity of plastics material.

3. A process as claimed in claim 1 comprising injecting the further quantity of material through the second sprue channel after material injected through the first sprue channel, or through another sprue channel, has extended to beneath said second sprue channel whereby said further quantity of material is injected to within and is enveloped by the material beneath said second sprue channel.

4. A process as claimed in claim 3 comprising injecting the further quantity of material through the second sprue channel before the core material injected through the first sprue channel has extended to beneath said second sprue channel.

5. A process as claimed in claim 2 comprising injecting the further quantity of material through the second sprue channel before the core material injected through the first sprue channel has extended to beneath the second sprue channel, whereby said further quantity of material does not penetrate to within the core material injected through the first sprue channel, and injecting said additional quantity of material through said second sprue channel after the core material injected through said first sprue channel has extended to beneath said second sprue channel.

6. A process as claimed in claim 5 comprising injecting said further quantity of material through the second sprue channel after the skin material injected through the first sprue channel has extended to beneath the second sprue channel.

7. A process as claimed in claim 1 comprising injecting a further quantity of skin material through the first sprue channel after injection of core material therethrough.

8. A process as claimed in claim 3 comprising injecting skin material through the second sprue channel after injection of the further quantity of material therethrough.

9. A process as claimed in claim 1 comprising injecting, as the core material, a foamable composition containing a polymeric material and a blowing agent at a temperature above the activation temperature of the blowing agent.

10. A process as claimed in claim 9 comprising injecting sufficient foamable composition that the mould cavity is filled before foaming takes place and then enlarging the mould cavity to permit foaming.

* * * * *